No. 686,075. Patented Nov. 5, 1901.
S. V. HUBER.
FEED MECHANISM FOR SHEARS.
(Application filed Feb. 2, 1901.)
(No Model.) 9 Sheets—Sheet 2.
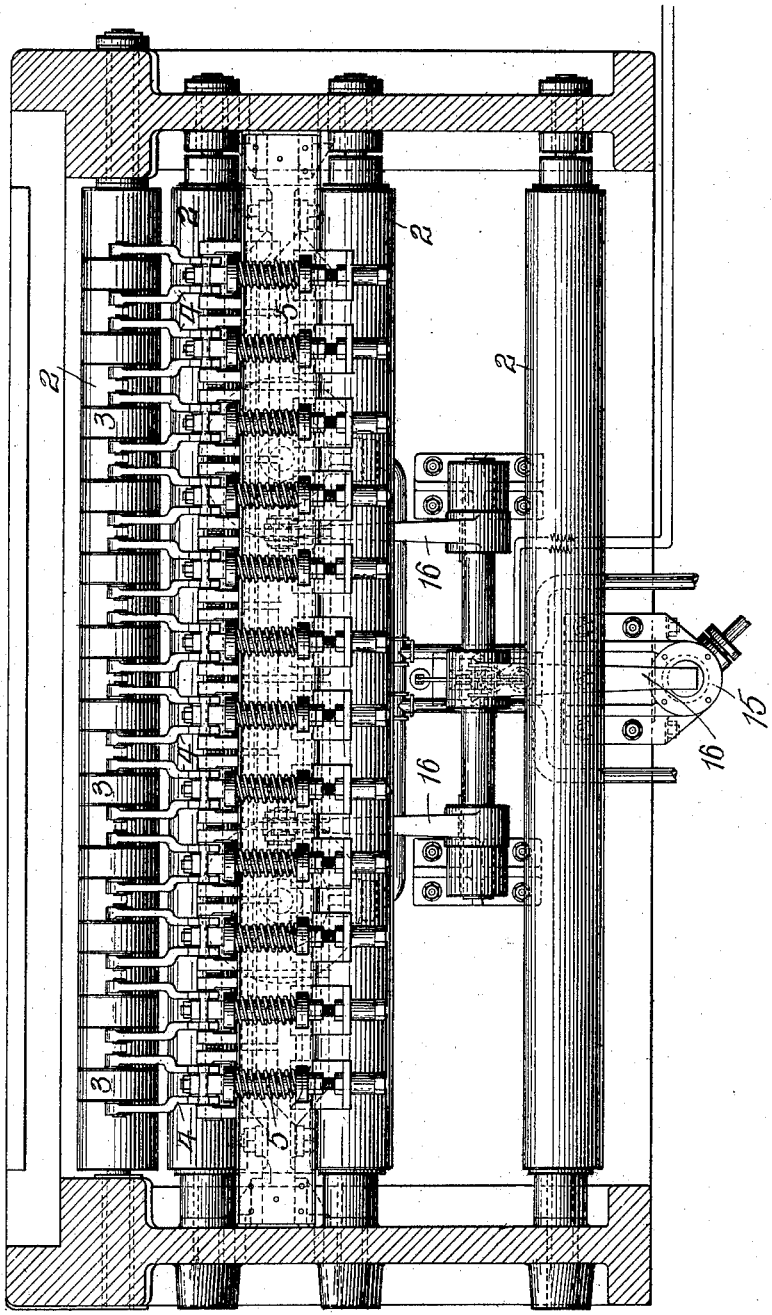
WITNESSES:
INVENTOR

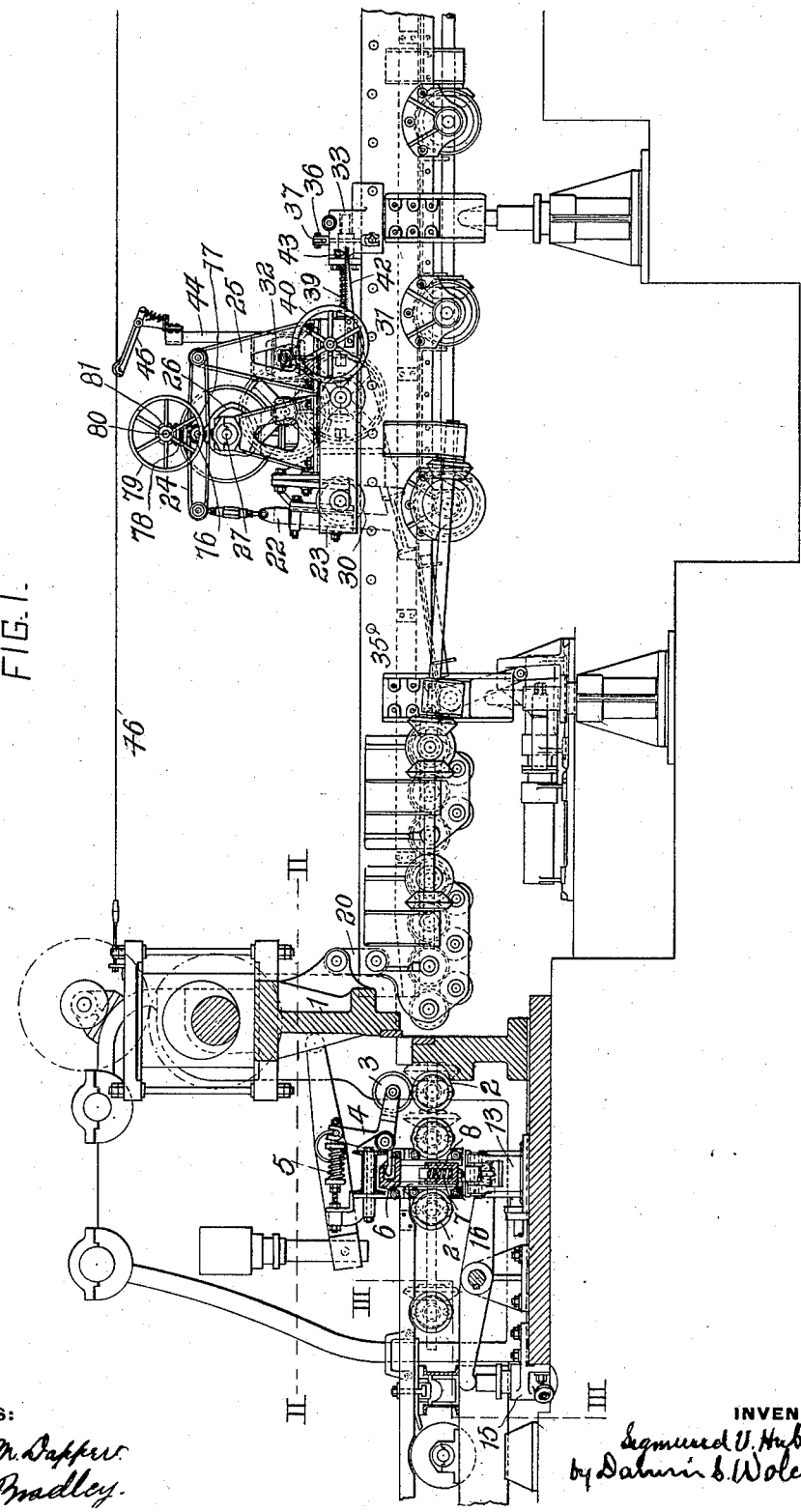

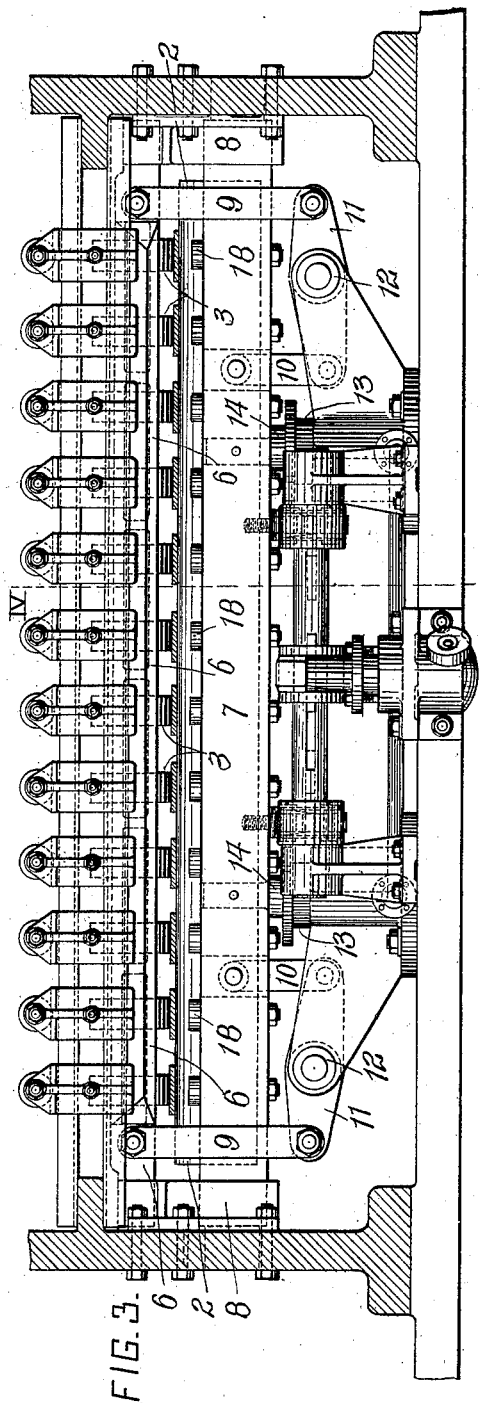

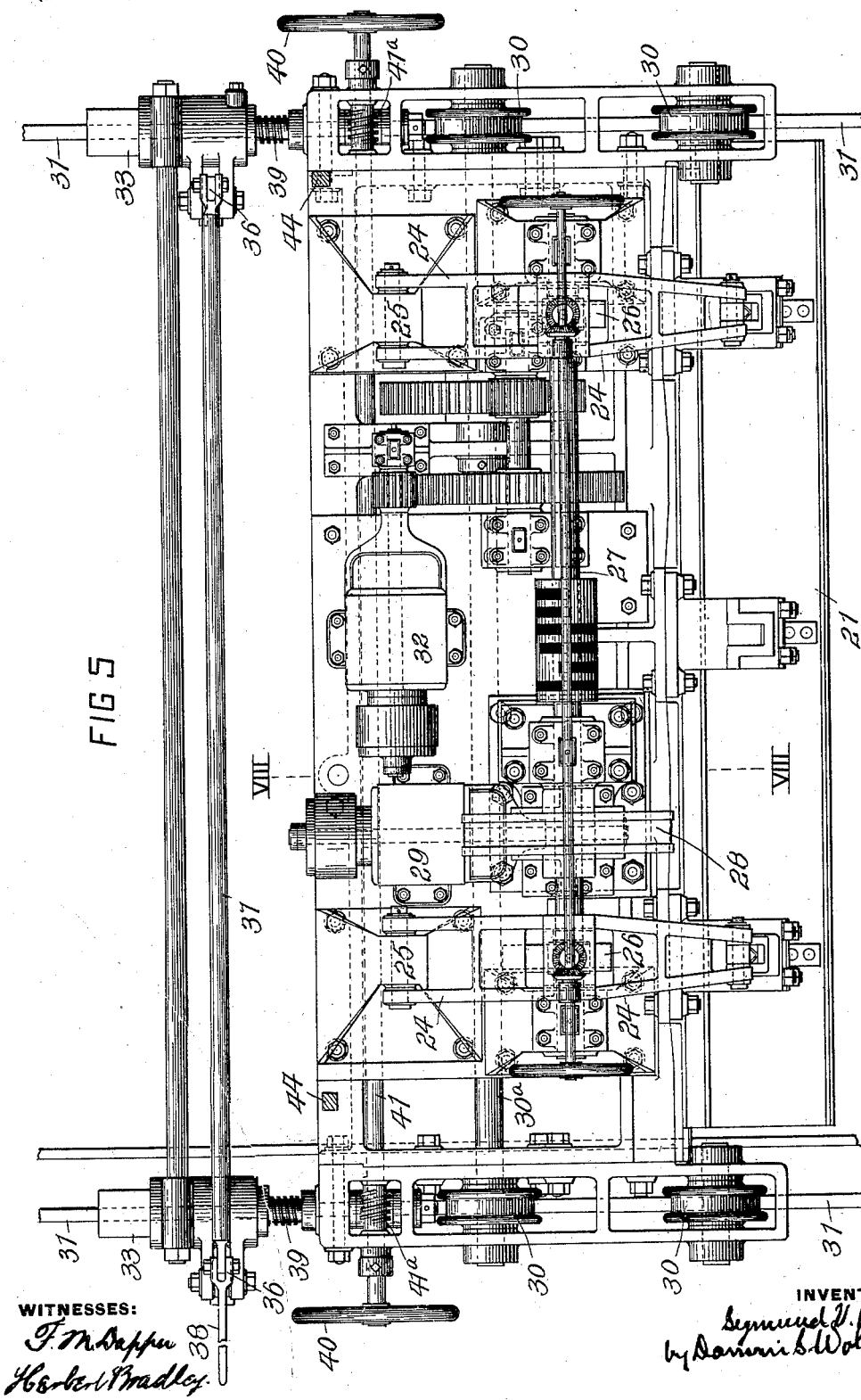

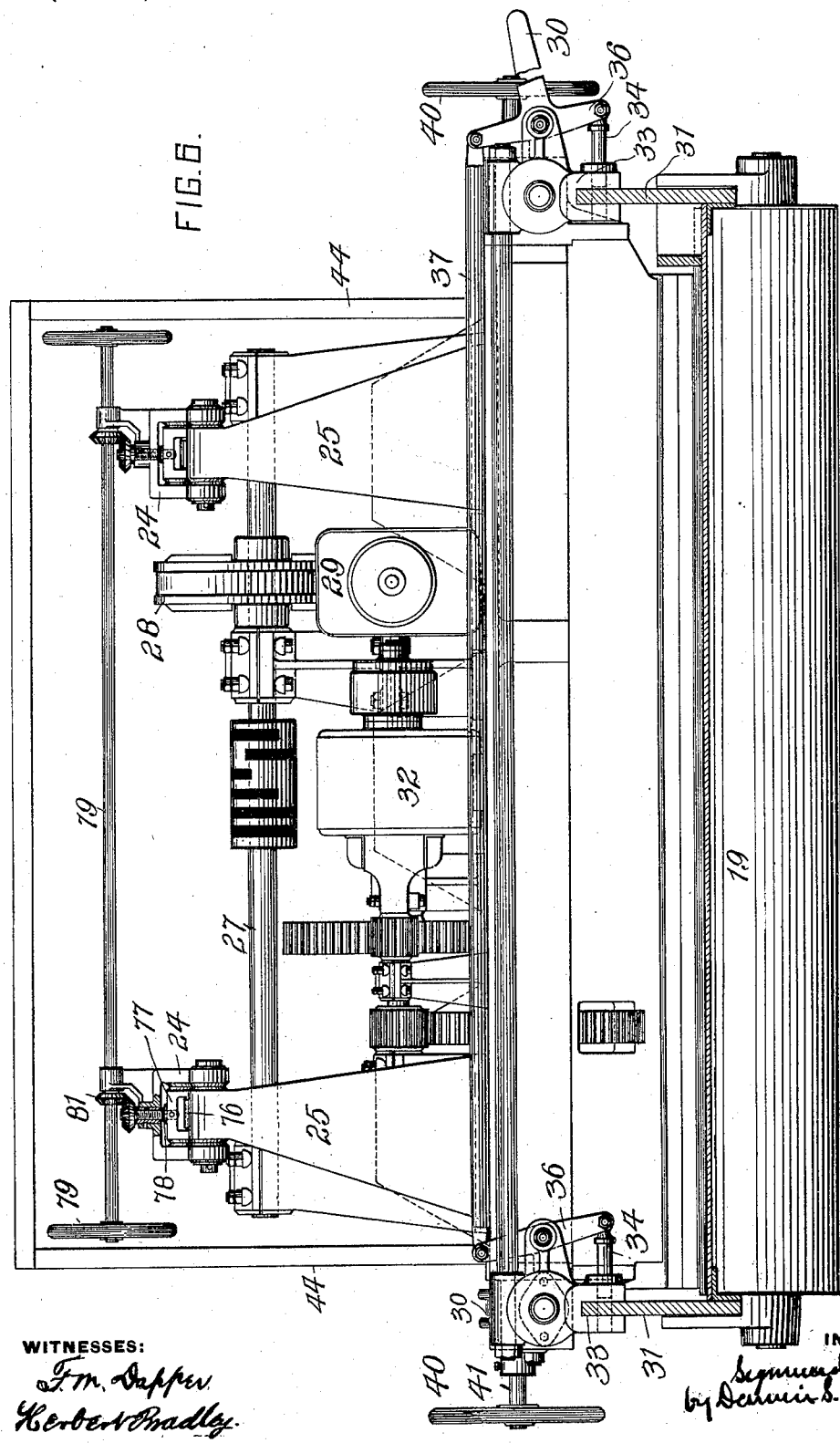

No. 686,075. Patented Nov. 5, 1901.
S. V. HUBER.
FEED MECHANISM FOR SHEARS.
(Application filed Feb. 2, 1901.)
(No Model.) 9 Sheets—Sheet 6.
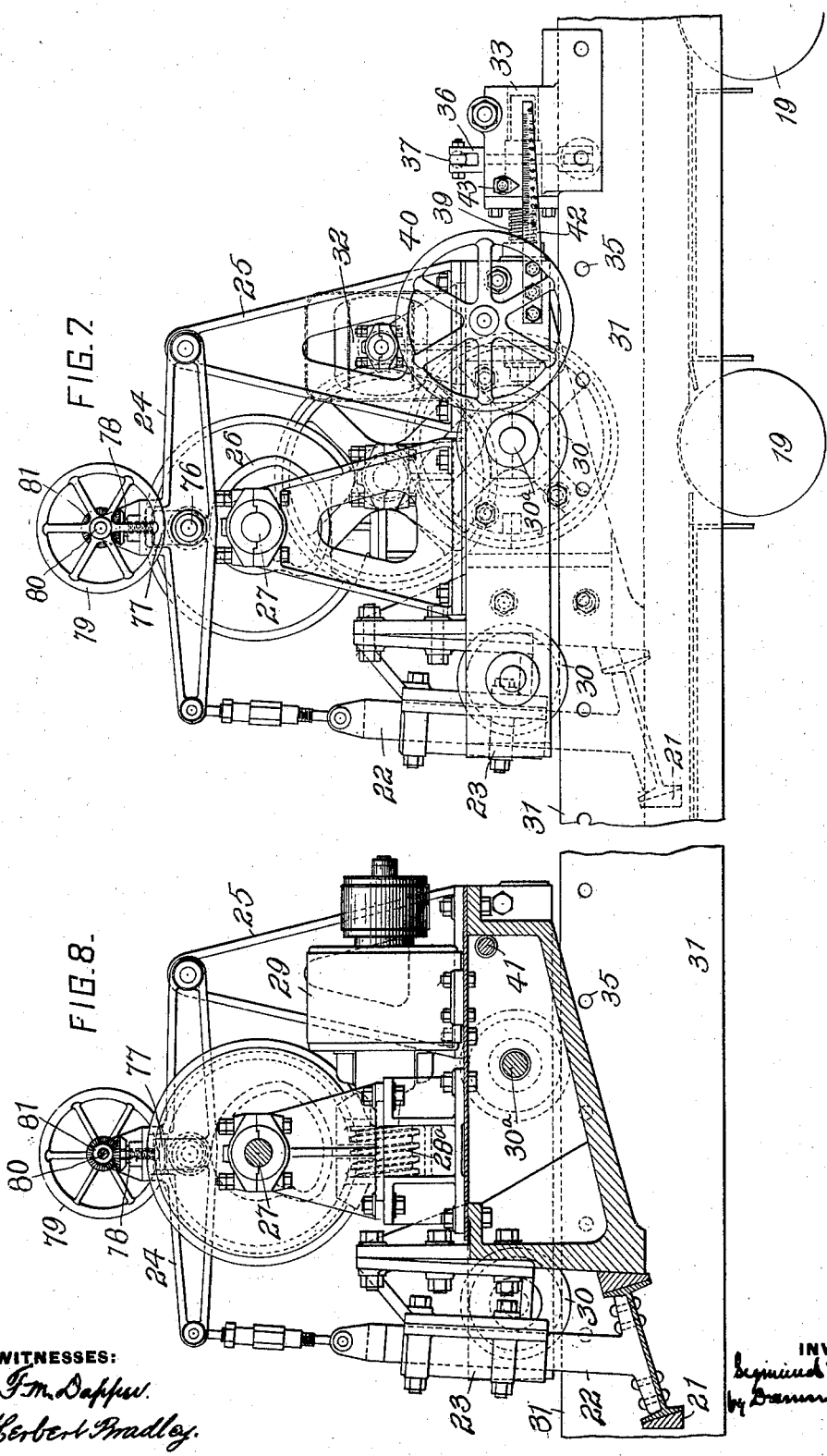
WITNESSES:
INVENTOR.

No. 686,075. Patented Nov. 5, 1901.
S. V. HUBER.
FEED MECHANISM FOR SHEARS.
(Application filed Feb. 2, 1901.)
(No Model.) 9 Sheets—Sheet 7.
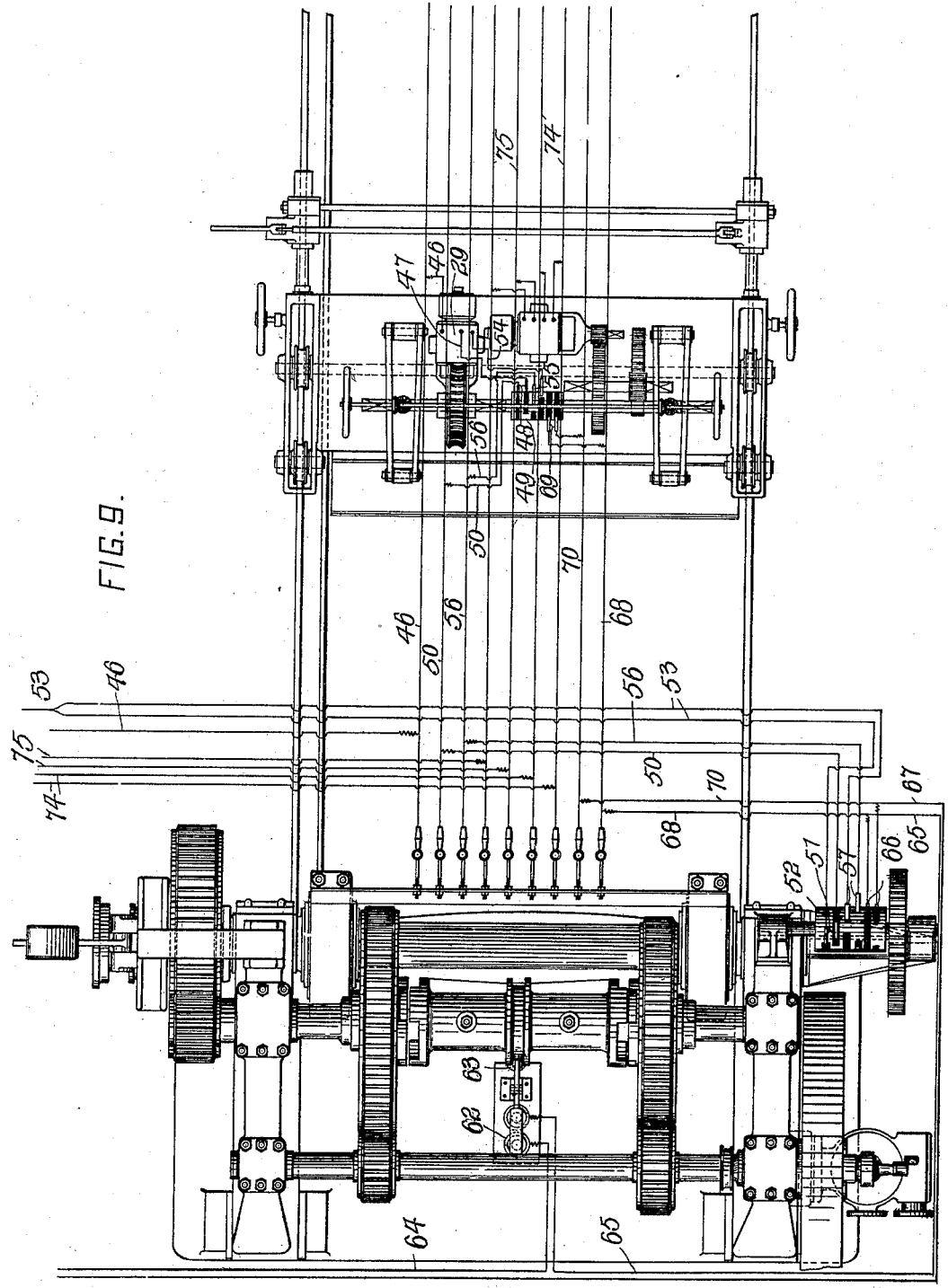

No. 686,075. Patented Nov. 5, 1901.
S. V. HUBER.
FEED MECHANISM FOR SHEARS.
(Application filed Feb. 2, 1901.)
(No Model.) 9 Sheets—Sheet 8.
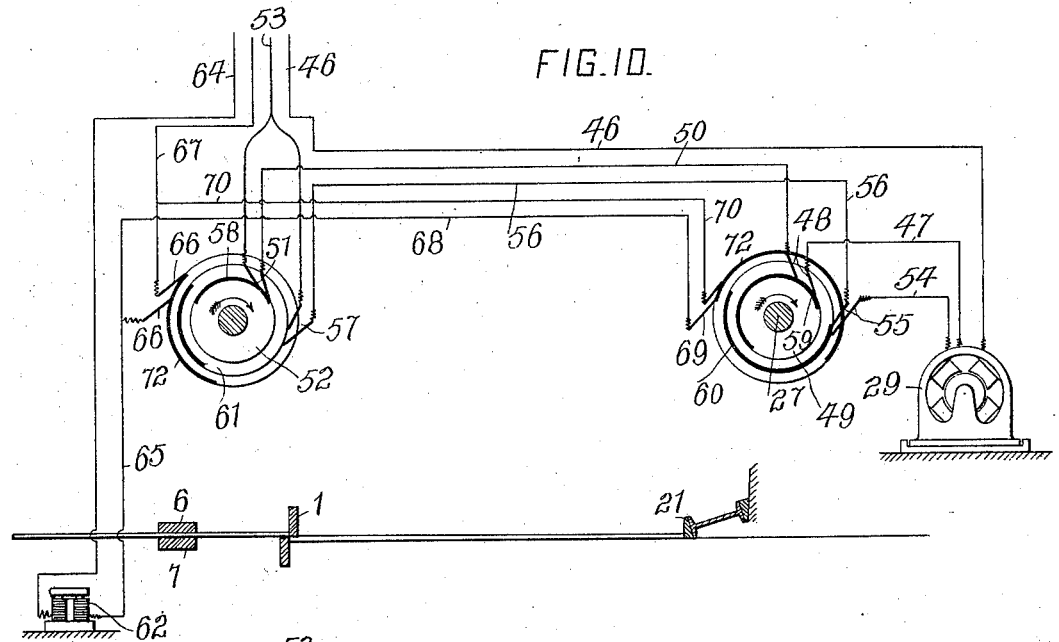
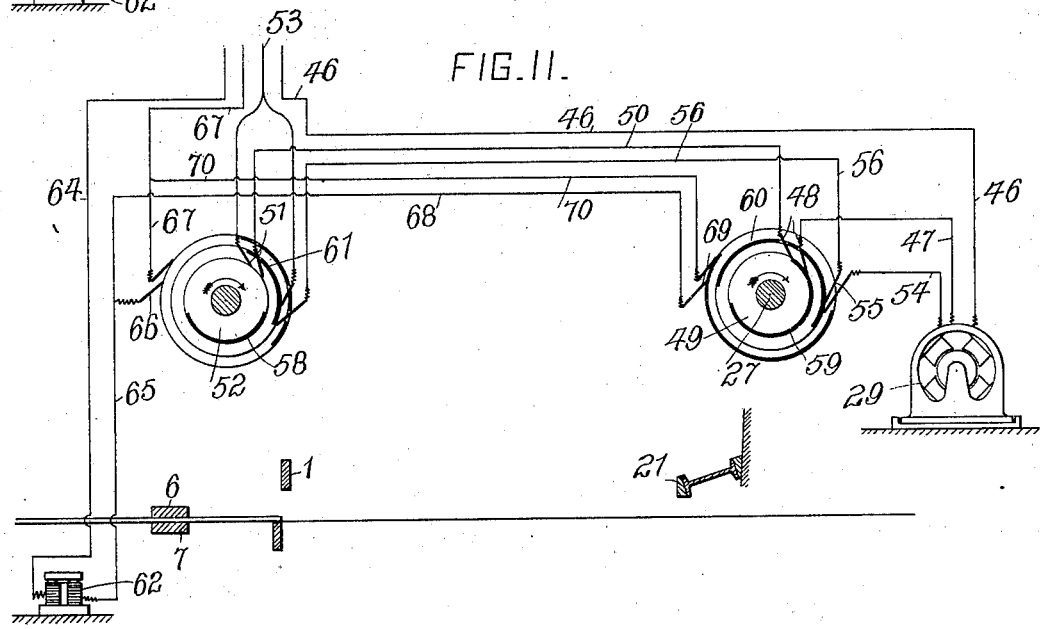

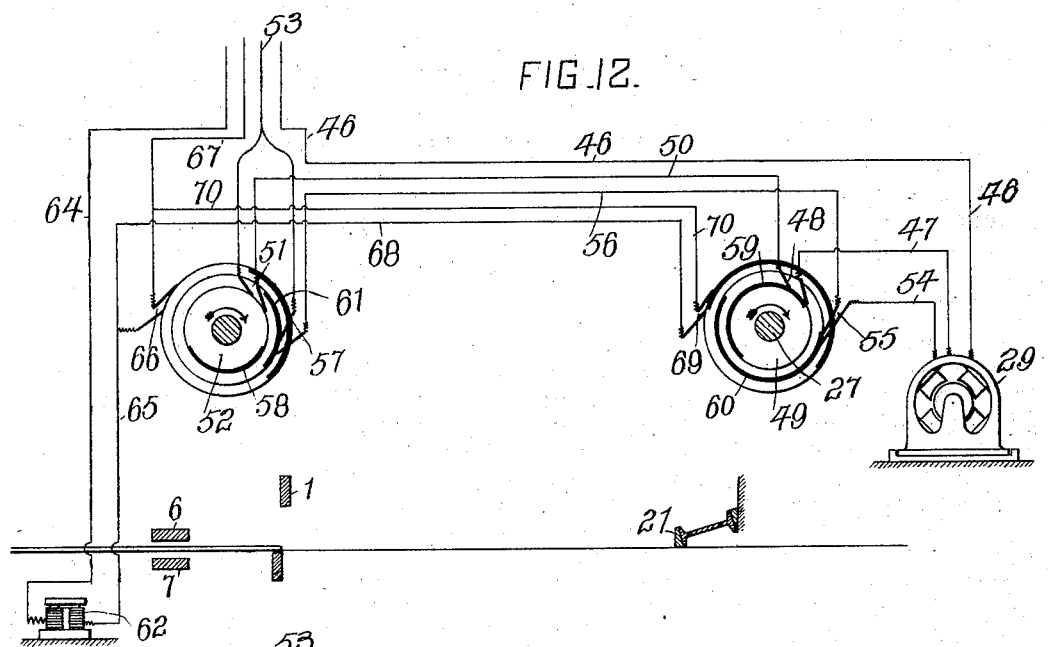
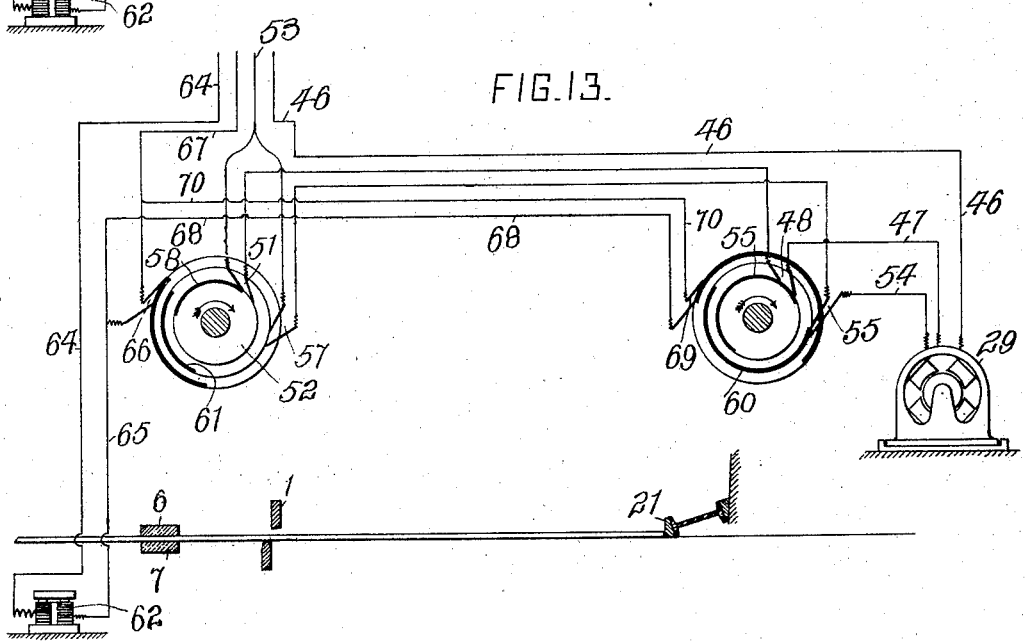

UNITED STATES PATENT OFFICE.

SIGMUND V. HUBER, OF PITTSBURG, PENNSYLVANIA.

FEED MECHANISM FOR SHEARS.

SPECIFICATION forming part of Letters Patent No. 686,075, dated November 5, 1901.

Application filed February 2, 1901. Serial No. 45,726. (No model.)

*To all whom it may concern:*

Be it known that I, SIGMUND V. HUBER, a citizen of the United States, residing at Pittsburg, in the county of Allegheny and State of Pennsylvania, have invented or discovered certain new and useful Improvements in Feed Mechanism for Shears, of which improvements the following is a specification.

The invention described herein relates to certain improvements in mechanism for shearing plates, bars, &c., and has for its object a construction whereby the feed of the plates or bars is prevented during the shearing operation and while the parts sheared are being fed away; and it is a further object of the invention to provide for the automatic removal of a gage-block from the path of movement of the sheared pieces and to provide for the consecutive operation of shearing, feeding, and clamping in such order and at such time intervals that the several operations can proceed without interfering with each other.

The invention is hereinafter more fully described and claimed.

In the accompanying drawings, forming a part of this specification, Figure 1 is a view, partly in section and partly in elevation, of a shear mechanism with feed, clamping, and gaging mechanism. Fig. 2 is a sectional plan view, the plane of section being indicated by the line II II, Fig. 1, of the mechanism for feeding the plates or bars to the shear and clamping them during the shearing operation.
Fig. 3 is a sectional elevation on the plane indicated by the line III III, Fig. 1. Fig. 4 is a similar view on a plane indicated by the line IV IV, Fig. 3. Fig. 5 is a top plan view, on an enlarged scale, of the gage mechanism.
Fig. 6 is a rear end elevation of the same. Fig. 7 is an end elevation of the gage mechanism. Fig. 8 is a transverse section on a plane indicated by the line VIII VIII, Fig. 5. Fig. 9 is a diagrammatic view illustrating several circuits controlling the operation of the gage and the clamping mechanism. Figs. 10, 11, 12, and 13 are diagrammatic views illustrating the operation of the electrically-controlled devices.
In the practice of my invention the shear mechanism is constructed in any suitable manner, the movable blade 1 being operated by a suitable motor directly or through suitable interposed mechanism, as gearing, shafts, and cams, as shown. Provision is made by a clutch mechanism, as is customary, whereby the movement of the movable blade can be controlled—*i. e.*, the blade can be stopped and started as desired. In front of the shear mechanism is arranged a suitable feed mechanism consisting of a series of positively-driven rollers 2 and by preference a series of upper rollers 3, arranged to bear yieldingly upon the plates or bars being fed. These rollers 3 are mounted so as to revolve loosely in arms of bell-crank levers 4, pivotally mounted upon a shaft or a series of shafts extending across the feed-table. The rollers are held yieldingly against the plates or bars by means of springs 5, which bear against the free arms of the bell-crank levers and against a suitable abutment, as clearly shown in Fig. 1. This construction permits of the independent movement of each of the upper presser-rollers, so that plates or bars of varying thicknesses can be simultaneously fed to the shear mechanism.

The clamping mechanism consists of two blocks or heads 6 and 7, arranged transversely of the front feed-table and above and below the plane of feed of the plates or bars. These blocks or heads are movably mounted in guides 8, secured to the side frame of the feed-table, and are respectively connected by links 9 and 10 to the ends of levers 11, having their journals mounted in suitable bearings 12. These levers are so connected to the heads or blocks that when one of the latter is moved up the other will be moved down, and vice versa, so that they move simultaneously toward and from the plates or bars on the feed-table. These heads or blocks are operated by fluid-pressure cylinders 13, provided with rams 14, which are connected to or support the lower head or block 7. As this head or block is raised by the rams the head or block 6 will be drawn down to effect a clamping of the plates or bars. The downward movement of the head or block 7 is effected by a fluid-pressure cylinder 15 through the medium of a lever 16, one end of which is connected to the head or block and the opposite end is shifted by the fluid-pressure cylinder 15, in which is kept a constant pressure sufficient to effect a downward pull on the head 7 when the cylinders 13 are relieved from pressure. To prevent an injury to the feed-rollers and the presser-rollers 3 while the plates or bars are held stationary, provision is made for lifting the rollers 3 during the operation of the clamp. For this purpose tailpieces 17 are connected to the bell-crank levers 4 and extend back so as to engage the upper clamping-head 6 in such manner that when the upper clamping head or block is moved down to engage the plates or bars the upper rollers 3 will be raised from the plates or bars. To prevent injury or defacement to the plates or bars, the lower clamping-head is provided with spring blocks or cushions 18 to bear against the plates or bars.

By the operation of the feed mechanism the plates or bars when released from the grip of the clamping mechanism are fed through between the blades of the shear and onto suitable feed-rollers 19 of the feed-table arranged in the rear of the shear mechanism. This feed-table is pivotally supported at or near its rear end, and its front end is connected by links 20 to the movable blade of the shear mechanism, so that such front or entering end of the feed-table will rise and fall with the movable blade. By the operation of the feed-tables in front and in the rear of the shear-blades the plates or bars will feed along until they come in contact with the movable stop or gage bar 21, formed on or secured to the lower ends of slides 22, which are mounted in suitable bearings 23, secured to the frame of the gage mechanism. The upper ends of these slides 22 are loosely connected to the free ends of levers 24, which have their opposite ends pivoted to standards 25, secured to the frame of the gage mechanism. The levers are shifted to raise and lower the gage bar or stop 21 by means of cams 26, secured on a shaft 27, mounted in suitable bearings on the frame of the machine. On this shaft is secured a worm-wheel 28, which intermeshes with the worm $28^a$, formed on the armature-shaft or on a shaft driven by the armature of the electric motor 29, whose operation is controlled as hereinafter described. The frame gage mechanism carrying the parts heretofore described is provided with wheels 30, mounted upon side rails 31 of the rear feed-table, arranged in the rear of the shear mechanism. As shown in Figs. 5 to 8, one pair of wheels is secured on shaft $30^a$, which is driven through suitable gearing by the electric motor 32, mounted upon the buggy, as shown in Figs. 5 and 6. In order to hold the gage mechanism in its adjusted positions, a suitable locking mechanism is connected to the buggy, whereby the latter may be secured to the rails 31 of the feed-table in any suitable manner, and this anchoring or clamping mechanism is adjustably connected to the gage-buggy proper for the purpose of permitting a more accurate adjustment of the gage-bar than can be quickly effected through the operation of the electric motor 32. A convenient construction for this purpose consists of connected slides 33, mounted upon the side rails 31 and provided with pins 34, adapted to be pushed into holes 35 in the side rails. The ends of these pins are connected to one end of levers 36, which have their opposite ends connected together by a rod or bar 37. The pins are simultaneously shifted into and out of engagement with the side rails by any convenient means—such, for example, as the handle 38, connected to one of the levers 36, as clearly shown in Figs. 5 and 6. This anchoring or clamping device is connected by screws 39 to the gage-buggy proper, and said screws are adapted to be turned by means of hand-wheels 40, secured on shaft 41, provided with worms $41^a$, engaging worm-wheels on the ends of the screws 39. The screws enter threaded openings in the slides 33, and when the latter are secured in position on the side rails, as described, a rotation of the screws will shift the gage-buggy toward and from the clamping or holding slides. The holes in the side rails 31 for the reception of the locking-pins are arranged an equal distance apart—say one foot, more or less—and by the operation of the electric motor the gage-buggy, with its clamping-slides, can be shifted such distance or a fraction of the distance between adjacent holes 35. Then the clamping or locking slides are secured to the side rails by the locking-pins, and if the gage is not in proper position the hand-wheels 40, operating the screws 39, are rotated so as to bring the gage bar or block 21 to the required position. It is preferred to arrange a scale 42, divided into fractional parts of the distances between the two adjacent holes 35 in the side rail, on either the clamping devices or the gage-buggy and to secure a pointer or index-finger 43 on the other member, as clearly shown in Fig. 1.

As hereinbefore stated, it is desirable that the gage buggy or block should be in operative position—i. e., in the line of feed of bars or plates on the feed-table—during the descent of the shear-blade, so as to stop the feed of the bars or plates, and that such gage-block should be lifted as soon as the shear-blade has operated and should remain up a sufficient time to permit of the feed of the sheared pieces beyond the gage-block. As soon as such sheared pieces have passed beyond the gage-block the latter should be lowered, and at the same time the clamping mechanism in front of the shear-blade should be operated so as to release the plates or bars held thereby and to permit their feed forward between the shear-blades to the gage-block. While these several movements may be effected in a variety of ways, to attain the best results the operation of the several mechanisms should be automatic and controlled one by the other and all controlled by the movable shear-blade. A desirable construction and arrangement of mechanism for this purpose consists in the employment of electric motors and suitable controllers for the currents through such motors. By reference to Figs. 1 and 9 it will be seen that a series of trolley-wires are arranged above the line of movement of the gage-buggy, on which are mounted posts or standards 44, carrying trolley-arms 45, yieldingly held in contact with these trolley-wires, so that the electric motors on gage-buggy will be in circuit with the generator, except as hereinafter described.

As shown in Figs. 9 to 13, one circuit is formed by a wire 46, extending from a generator (not shown) to one pole of the electric motor 29. The other pole of this motor is connected by a wire 47 to one of a pair of brushes 48, bearing on the commutator 49 on the shaft 27 of the gage-buggy, the other brush of the pair, wire 50, one of a pair of brushes 51 of the commutator 52 on the power-shaft of the shear or a counter-shaft operated by the power-shaft, the other brush of this pair, and wire 53 to the generator. A second circuit, for purposes hereinafter described, consists of wire 46, motor 29, wire 54 from the other terminal of motor, one of a pair of brushes 55 of the commutator 49, the other brush of the pair, wire 56, one of a pair of brushes 57 of the commutator 52, the other brush of the pair, and wire 53 to the generator. By this arrangement of circuits it is necessary for the operation of the motor 29, either up or down, that the shear-blade should be in a certain predetermined position. Before the gage bar or block can be raised by motor 29 it is necessary that the shear-blade should be at the lower limit of its stroke, at which time the brushes 51 will be electrically connected by a metallic strip 58 on the commutator 52, so that a current will be established from the generator through the wire 46 to the motor, wire 47, brushes 48, which are connected by a suitable strip 59 on the commutator 49, wire 50, brushes 51, and wire 53 to the generator. As long as this circuit is maintained the motor 29 will be operated to raise the gage-block; but the upward movement will be arrested as soon as the gage-block has reached the upward limit of its movement by the passage of the metallic strip 59 of the commutator 49 away from one or both of the brushes 48 and also by the passage of the metallic strip 58 on the commutator 52 from the brushes 51. The breakage of the circuit at either commutator will arrest the upward movement of the gage-block. At about the time of rupture of the connection between the brushes 48 of the commutator 49 the brushes 55 of the same commutator will be connected by a suitable strip 60 on the commutator 49, thereby restoring at this point the circuit through the motor 29, consisting of wire 46, motor, wire 54, brushes 55, wire 56, brushes 57 of commutator 52, and wire 53; but this circuit through the motor will be held open, as the brushes 57 will not be electrically connected by stop 61 until the shear-blade begins its downward movement or just as it completes its upward movement. As soon as the gage is returned to or nearly to operative position in line with the feed of the plates or bars the clamping mechanism should be released, so as to permit of the forward feed of the plates or bars to be sheared. This is effected by means of an electric motor—as, for example, an electromagnet 62, having its armature connected to the valve 63 of the fluid-pressure cylinders 13, operating the clamps. The circuit of this motor is controlled by means of the commutators 49 and 52, so that both the gage-block and the shear must be in a certain predetermined position prior to the operation—i. e., either the opening or closing of the clamp. The circuit for this electric motor consists of the wire 64, leading from a generator, the motor 62, the wire 65, brushes 66 of commutator 52, and wire 67 to generator or wire 68, brushes 69 of commutator 49, and wires 70 and 67 to generator.

In Fig. 10 is shown diagrammatically the position of the shear, the clamp, and the gage bar or block and commutators 49 and 52 just as the shear has completed its downward stroke. It will be observed that the strip 60 is just leaving the brushes 55 and that the brushes 57 are out of contact with their strip 61 on the commutator 52, showing that the gage-block is in its lowest position and was at rest some time prior to the completion of the downward stroke of the shear. The strip 59 of commutator 49 and the strip of commutator 52 are in contact with their brushes, so that the motor was at the completion of the stroke of the shear in operation to lift the gage-block. The strips 71 and 72 of the commutators are in contact with the brushes 66 and 69 of the circuit through the motor 62, controlling the clamp, so that such clamp is in operative position to prevent any onward feed of the bars or plates between the shear.

In Fig. 11 the shear-blade and gage-block are shown raised, the circuit for the gage-block, formed in part by brushes 51, is broken, and the circuit for continuing the operation of the motor so as to drop the gage-block is completed and the latter is in its downward movement. The circuit for the motor 62, controlling the clamp, is broken on commutator 52, but is closed and will be held closed on commutator 49 until the gage-block is down.

In Fig. 12 the shear-blade is still up, the gage-block has completed its downward movement and is at rest, and the circuit for the motor controlling the clamp is broken, so that the clamp has separated to permit the onward feed of the bars.

In Fig. 13 the circuits for the gage-block are broken on the commutator 52, the circuit for the motor 62 of the clamp mechanism is completed and the clamp is in operative position to prevent an onward movement of the plates or bars, and the shear-blade is part way down to shear the bars or plates.

In Fig. 9 are shown two complete circuits, formed by wires 74 and 75, for the motor 32 for shifting the gage-buggy back and forth. By means of these circuits, which are controlled by suitably-located switches, reverse currents can be sent through the motor 32 to shift the gage-buggy back and forth as required.

By reference to Figs. 1 and 7 it will be seen that the aprons of the rear feed-table are below the upper surfaces of the feed-rollers 19 and that the stroke or place of movement of the gage-block must be adjusted so that it will bear upon the apron and also upon the roller. A change of position of movement is provided for by employing rollers 76 as the bearings for the cams 26 on the levers 24. These rollers 76 are mounted in the sliding blocks 77, and the adjustment of the blocks and rollers is effected by means of screws 78, connected with blocks, so that by the rotation of the screws the blocks can be shifted in the levers. The screws are operated by means of hand-wheels 79 on a shaft 80, said shaft being provided with beveled pinions 81, intermeshing with corresponding pinions on the upper ends of the adjusting-screws. By moving these bearing-rollers 76 up and down the position of stroke of the gage-block can be changed as required to cause the gage-block to bear on the aprons or feed-rollers 19.

I claim herein as my invention—

1. In a mechanism for shearing plates or bars, the combination of a shearing mechanism, mechanism for clamping the plates or bars in front of the shearing mechanism, and means controlled by the shearing mechanism for operating the clamping mechanism, substantially as set forth.

2. In a mechanism for shearing plates or bars, &c., the combination of a shearing mechanism, positively-driven feed-rollers arranged in front of the shear mechanism, presser-rollers, means for holding the presser-rollers yieldingly against the plates or bars on the feed-rollers, means for shifting the presser-rollers controlled by the shear mechanism, substantially as set forth.

3. In a mechanism for shearing plates or bars, &c., the combination of a shearing mechanism, a clamping mechanism arranged in front of the shear mechanism, mechanism for feeding the plates or bars to the shearing mechanism controlled by the clamping mechanism, and means controlled by the shearing mechanism for operating the clamping mechanism, substantially as set forth.

4. In a mechanism for shearing plates, bars, &c., the combination of a shearing mechanism, a movable gage block or bar arranged in the rear of the shearing mechanism, a clamping mechanism arranged in front of the shearing mechanism, and means controlled by the shearing mechanism and the gage block or bar for shifting the clamping mechanism, substantially as set forth.

5. In a mechanism for shearing plates, bars, &c., the combination of a shearing mechanism, a series of trolley-wires arranged in the rear of the shearing mechanism and connected to a suitable generator, a carriage or buggy movably mounted in the rear of the shearing mechanism, a gage block or bar mounted in the buggy, electric motors arranged upon the buggy or carriage for shifting the buggy and gage-block, movable contacts for connecting the motors with the trolley-wires, switches or make-and-break mechanisms controlling the electric motors, substantially as set forth.

6. In a mechanism for shearing plates, bars, &c., the combination of a gage block or bar, means for shifting the gage block or bar into and out of the line or path of movement of the plates or bars, and means for changing the position of movement of the gage block or bar, substantially as set forth.

7. In a mechanism for shearing plates, bars, &c., the combination of a shearing mechanism, a gage block or bar, electrically-controlled mechanism for shifting the gage block or bar, and make-and-break mechanisms operated by the shearing mechanism and by the mechanism for shifting the gage block or bar controlling the circuits of the gage-operating motor, substantially as set forth.

8. In a mechanism for shearing plates, bars, &c., the combination of a shearing mechanism, mechanism for feeding the plates or bars, a gage block or bar movable into and out of the line of movement of the plates or bars and a clamping mechanism controlled by the gage block or bar, substantially as set forth.

9. In a mechanism for shearing plates, bars, &c., the combination of a shearing mechanism, a gage block or bar, and mechanism for feeding the plates or bars controlled by the gage block or bar, substantially as set forth.

In testimony whereof I have hereunto set my hand.

SIGMUND V. HUBER.

Witnesses:
DARWIN S. WOLCOTT,
F. E. GAITHER.